US012311778B2

(12) United States Patent
Ruppert (10) Patent No.: US 12,311,778 B2
(45) Date of Patent: May 27, 2025

(54) METHOD FOR OPERATING AN ELECTRICAL CIRCUIT COMPRISING AT LEAST ONE SWITCHING ELEMENT OF A MOTOR VEHICLE, AND A MOTOR VEHICLE (71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 405 days.

(21) Appl. No.: 17/853,583

(22) Filed: Jun. 29, 2022

(65) Prior Publication Data
US 2023/0021073 A1 Jan. 19, 2023

(30) Foreign Application Priority Data

Jun. 30, 2021 (DE) .......................... 102021116772.8

(51) Int. Cl.
*B60L 15/20* (2006.01)
*H02K 7/14* (2006.01)
*H02K 11/33* (2016.01)

(52) U.S. Cl.
CPC ............ *B60L 15/2045* (2013.01); *H02K 7/14* (2013.01); *H02K 11/33* (2016.01)

(58) Field of Classification Search
CPC .. B60L 15/2045; B60L 15/007; B60L 3/0023; B60L 2260/32; H02K 7/14; H02K 11/33; H03K 17/687; G01R 31/26
See application file for complete search history.

(56) References Cited

U.S. PATENT DOCUMENTS

| 5,881,374 A * | 3/1999 | Osterberg | H03L 7/085 375/376 |
| 7,148,697 B2 * | 12/2006 | Doljack | G01R 27/2605 324/548 |
| 7,592,876 B2 * | 9/2009 | Newman | G01R 31/2856 331/2 |
| 7,688,151 B2 * | 3/2010 | Lee | H03L 1/00 331/158 |
| 7,982,333 B2 * | 7/2011 | Wolf | H02J 7/14 361/18 |

(Continued)

FOREIGN PATENT DOCUMENTS

| CN | 104849645 A | 8/2015 |
| DE | 102015204343 A1 | 9/2016 |

(Continued)

*Primary Examiner* — Mussa A Shaawat
(74) *Attorney, Agent, or Firm* — Seed IP Law Group LLP (57) ABSTRACT A method for operating an electrical circuit comprising at least one switching element of a motor vehicle is disclosed, wherein the switching element has a control voltage applied to it by a control device and the switching element is switched by the control voltage, wherein during at least one switching process there is determined at least one voltage measurement value describing a voltage of a Miller plateau of the control voltage and/or at least one time measurement value describing a duration of the Miller plateau, wherein the voltage measurement value and/or the time measurement value is compared respectively to at least one associated limit value and upon exceeding at least one limit value the control device initiates at least one action associated with the exceeded limit value.

13 Claims, 5 Drawing Sheets

(56) References Cited

U.S. PATENT DOCUMENTS

| | | | | |
|---|---|---|---|---|
| 8,076,794 B2* | 12/2011 | Proebstle | | B60L 58/20 307/130 |
| 9,634,656 B2* | 4/2017 | Inazu | | H03K 17/122 |
| 10,114,068 B1* | 10/2018 | Chen | | G01R 31/2879 |
| 10,215,795 B1* | 2/2019 | Zannoth | | G01R 19/16519 |
| 10,469,057 B1* | 11/2019 | Frank | | H03K 17/0412 |
| 10,931,273 B1* | 2/2021 | Panaite | | H03K 17/687 |
| 2004/0100150 A1* | 5/2004 | Bolz | | H03K 17/162 307/116 |
| 2004/0112320 A1* | 6/2004 | Bolz | | H02J 7/1423 290/31 |
| 2004/0164705 A1* | 8/2004 | Taniguchi | | H02J 7/1423 320/104 |
| 2007/0007930 A1* | 1/2007 | Bolz | | H01F 7/1805 323/205 |
| 2008/0151454 A1* | 6/2008 | Uhl | | B60R 21/017 361/87 |
| 2009/0273236 A1* | 11/2009 | Broesse | | H02J 7/1423 307/9.1 |
| 2010/0194400 A1* | 8/2010 | Baumann | | G01R 31/3016 324/76.19 |
| 2011/0012424 A1* | 1/2011 | Wortberg | | H02J 1/08 307/9.1 |
| 2013/0063188 A1* | 3/2013 | Sogo | | H03K 17/0828 327/109 |
| 2013/0208763 A1* | 8/2013 | Uwe | | G06K 19/0717 374/171 |
| 2014/0306687 A1* | 10/2014 | Ahmadi | | G01R 31/31727 324/76.11 |
| 2015/0249407 A1* | 9/2015 | Park | | H02P 6/14 318/400.13 |
| 2018/0269869 A1* | 9/2018 | Mukhopadhyay | | H02M 1/08 |
| 2020/0400738 A1 | 12/2020 | Akin et al. | | |
| 2021/0022403 A1* | 1/2021 | Korus | | A61M 15/06 |
| 2021/0111717 A1* | 4/2021 | Fechalos | | H02H 11/005 |
| 2024/0168076 A1* | 5/2024 | Hilsenbeck | | G01R 31/42 |

FOREIGN PATENT DOCUMENTS

| | | |
|---|---|---|
| DE | 102019128531 A1 | 4/2021 |
| EP | 2398140 B1 | 12/2017 |

\* cited by examiner

METHOD FOR OPERATING AN ELECTRICAL CIRCUIT COMPRISING AT LEAST ONE SWITCHING ELEMENT OF A MOTOR VEHICLE, AND A MOTOR VEHICLE

BACKGROUND

Technical Field

Embodiments of the invention relate to a method for operating an electrical circuit comprising at least one switching element of a motor vehicle, wherein the switching element has a control voltage applied to it by a control device and the switching element is switched by the control voltage. Moreover, embodiments of the invention relate to a motor vehicle.

Description of the Related Art

Electrical switching elements which are used in the motor vehicle, for example in power electronic circuits, may be subject to aging effects, which may result from the temperature cycles experienced by the switching element during the operation of the electrical circuit or the motor vehicle. These aging effects, when modest, present no problem, nor do they affect the function of the switching element or the electrical circuit device. However, when large, the aging effects lead to impairment of the function of the switching element and thus also that of the electrical switching device.

In order to offset impairments caused by aging switching elements, it is known for example how to make circuits or individual components of circuits redundant, so that in the event of significant aging of a switching element there is another switching element and/or another electrical circuit on hand to take over its operation. Another possibility is to replace individual parts after established time intervals, in order to prevent excessive aging of the components.

However, these possibilities have drawbacks. By providing for redundant systems, more design space is required and the manufacturing costs and material costs increase. Moreover, the expense in the production of the motor vehicle and the weight of the motor vehicle also increase. The replacement of components after certain time intervals means that parts not having any significant aging effects are also replaced, since the aging during the time interval also depends in particular on the operating frequency and the operating conditions of the components. Various methods are known in the prior art for taking into account the condition of an electronic component.

In U.S. Pat. No. 10,469,057 B1, a gate driver circuit is described for driving a transistor, in which a measurement value is detected that is proportional to an input capacitance of the transistor. Depending on this measurement value, a correction factor is determined, and the transistor is driven by the gate driver circuit in dependence on the correction factor.

From US 2020/0400738 A1 there is known a method for determining the condition of a silicon carbide field effect transistor. For this, two test gate-source voltages are applied to the transistor, and a saturation resistance of the drain-source portion is determined from the measurement values ascertained with the aid of this voltage, in order to determine the degree of degradation of the gate oxide of the transistor. In addition, the value of a forward resistance in the switched-on state of the transistor is used to determine the degree of degradation of contact resistances of the transistor.

CN 104849645 A describes a method for determining the aging of a metal oxide semiconductor field effect transistor, taking into account the voltage of a Miller plateau of the transistor. Depending on a currently determined state of the transistor and a limit value describing a failure of the transistors, an anticipated lifetime is predicted for the transistor.

BRIEF SUMMARY

Some embodiments indicate an improved method for operating an electrical circuit comprising at least one switching element of a motor vehicle, which improves in particular the operational security of the electrical circuit or the motor vehicle.

In some embodiments, during at least one switching process, there is determined at least one voltage measurement value describing a voltage of a Miller plateau of the control voltage and/or at least one time measurement value describing a duration of the Miller plateau, wherein the voltage measurement value and/or the time measurement value is compared respectively to at least one associated limit value and upon exceeding at least one limit value the control device initiates at least one action associated with the exceeded limit value.

During the operation of the electrical circuit device in the motor vehicle, the switching element is switched by means of the control voltage generated by the control device, i.e., it is alternately switched between a switched-on state and a switched-off state. During at least one of these switching processes, i.e., in the ongoing operation of the electrical circuit or the switching element, at least one voltage measurement value describing a voltage of the Miller plateau of the control voltage and/or at least one time measurement value describing a duration of the Miller plateau is determined. The at least one voltage measurement value and/or the at least one time measurement value can be determined in particular by the control unit. The method in the case of an electrical circuit comprising multiple switching elements can also be carried out for several of the switching elements, in particular, for each of the switching elements, so that each time an aging condition can be determined for these switching elements.

A voltage measurement value here describes a voltage of the Miller plateau. The voltage of the Miller plateau can remain constant for a duration of the Miller plateau or it can change slightly, in which case multiple voltage measurement values of the Miller plateau can be measured. The measuring of an average voltage as the voltage measurement value, or the measuring of a voltage of the Miller plateau at a given time, such as the start of the Miller plateau and/or the end of the Miller plateau, as the voltage measurement value is also possible.

In addition to or alternatively to the voltage measurement value, the duration of the Miller plateau, i.e., the duration in which the Miller plateau is formed in the variation of the control voltage, can also be detected as the time measurement value. Both the magnitude of the voltage of the Miller plateau and the duration of the Miller plateau represent a measure of the aging of the switching element, so that with these values one can judge the aging condition or "state of health" of the switching element.

In a switching element configured for example as a metal oxide semiconductor field effect transistor (MOSFET), the gate material or the gate oxide constitutes a component critically affected by the aging of the switching element. The gate oxide of the transistor can over the lifetime of the transistor result in a change in the component's characteristics, which may be manifested in particular by a changing of the prominence of the Miller plateau in the variation of the control voltage. The Miller plateau depends in particular on the gate-drain capacitance of the transistor, which in turn depends on the state of the gate oxide. Other kinds of switching elements, such as insulating gate bipolar transistors (IGBT), also have such a Miller plateau in the variation of their control voltage, so that the method can be used to advantage for different types of switching elements.

The voltage measurement values and/or time measurement values determined during the switching process, especially during a switching-on process and/or during a switching-off process, are compared each time to at least one associated limit value. If at least one of these limit values is exceeded, the control device initiates at least one action which is associated with the respective limit value exceeded. This makes it possible for the control device to take an action which allows for the aging of the switching element. This makes it possible to take an action, based on the aging of the switching element as determined by the voltage measurement value and/or the time measurement value, before a function impairment of the switching element, the electrical circuit, or the motor vehicle has occurred. Thus, an action can thereby be taken prospectively, once a predetermined degree of aging of the switching element has been reached. No unwanted function impairment need have taken place in order to take account of the aging, before action is taken to allow for the aging of the switching element. In this way, the operational security of the electrical circuit of the motor vehicle and thus also the operational security of the motor vehicle can be assured.

In this way it is possible to do away with a stockpile of redundant systems, especially also in the case of autonomous motor vehicles, since an action to take account of the aging can already be taken before a function impairment occurs. Redundant systems are not needed to compensate for a failure of the switching element, since a response is already possible to the aging of the switching element before a failure occurs. In particular, a failure or other function impairment can even be prevented from occurring at all thanks to the at least one action taken.

Some methods described herein have the advantage, compared to the replacement of individual components after a predetermined servicing interval, that an action to take account of aging is taken when an aging of the switching element actually occurs. Thus, one can do without a replacement of parts after an established servicing interval. One can thus avoid replacing parts not yet showing any significant aging effects. Thanks to the possibility of replacing only a switching element having a significant aging during a servicing process, the servicing costs are reduced. Furthermore, the servicing can be done "on demand", i.e., as needed.

Some methods described herein make it possible to do away with an oversized dimensioning of the switching elements, for example the providing of additional chip surface, and/or the stockpiling of redundant components. In this way, the manufacturing costs, the material costs, and the weight of the motor vehicle can be reduced. The development costs or the development expense are also reduced, since it is not necessary to develop two redundant systems and arrange them in the motor vehicle. Furthermore, the method simplifies the designing of switching elements based for example on semiconductors according to their actually required chip surface, since the method makes possible an exact monitoring or exact watching over the condition of the switching element or the switching elements. This makes it possible to design future switching elements for example with the aid of data obtained through the monitoring and to do away with a design process using merely key operating points or maximum values.

The at least one voltage measurement value and/or the at least one time measurement value can be determined for example at the start of an operation of the electrical circuit in the motor vehicle, for example at the start of a driving operation of the motor vehicle. The driving operation may be a driving operation steered by a driver or a partly autonomous or fully autonomous driving operation. Since the aging of the components is a process extending over a few years, it may be sufficient to perform the determination once at the start of the operation of the electrical circuit, especially at the start of a driving operation of the motor vehicle. This makes it possible to also take a necessary action already at the start of driving. Alternatively, more closely spaced checks of the condition are possible, especially since the voltage measurement value and/or the time measurement value can be determined during ongoing operation of the switching element or the circuit and the motor vehicle. Thus, a checking of the condition of the switching element can also be done during a driving operation with no function impairment or function interruption of the electrical circuit and an action can be initiated if so required.

In some embodiments, the voltage measurement value and/or the time measurement value can be respectively compared to multiple limit values, and different actions are associated respectively with the limit values. This makes it possible to carry out an action against the corresponding aging of the switching element depending on the ascertained voltage measurement value and/or the ascertained time measurement value. Thus, different actions can be taken according to the extent of the aging found for the switching element. The limit values here may correspond to different voltage values or different time values, which are compared to the measured voltage measurement value or the measured time measurement value, so that different stages of actions will result.

In some embodiments, the action may involve the decreasing of a time interval between the determination of the voltage measurement values and/or the time measurement values for different switching processes, the decreasing of the frequency of the switching processes of the switching element, the decreasing of an output voltage and/or an output current of the switching element, the disconnecting of the switching element and/or the electrical circuit and/or the indication of aging information regarding the aging of the switching element in the motor vehicle and/or the relaying of this information to a communication device external to the vehicle. It is possible to provide many of these actions, the actions being associated each time with different limit values. A first or lowest limit value may have as its associated action the reducing of the time interval between the determination of the voltage measurement values and/or the time measurement values for different switching processes. This makes it possible to increase the frequency with which the voltage measurement values and/or time measurement values are detected upon reaching a certain degree of aging of the switching element. In this way, the aging of the switching element can be tracked with a significantly higher time resolution.

Another limit value can be associated with reducing the frequency of the switching processes of the switching element, for example in order to slow down the progressive aging of the switching element. In order to avoid overloading of the switching element, further limit values can be associated with the lowering of an output voltage and/or an output current of the switching element. As a last action, as the highest or lowest limit value, the switching element and/or the entire electrical circuit can be disconnected.

With increasing aging, both the voltage, or magnitude of the voltage, of the Miller plateau and the duration of the Miller plateau will increase, so that the limit values or their respective magnitudes may likewise increase, in order to allow for progressive levels of aging. In the event that both voltage measurement values and time measurement values are detected, different limit values may be specified respectively for the voltage measurement values and the time measurement values, upon reaching of which the associated action will be taken.

Furthermore, the action associated with one or more of the limit values can be the indication of aging information in the motor vehicle regarding the aging of the switching element. In this way, the driver or a passenger in the motor vehicle can be alerted as to the aging detected. The aging information may also describe a further action taken on account of the exceeding of a limit value, so that this also can be indicated. The aging information can be indicated, for example, on a display device. In addition or alternatively, the aging information can also be relayed to a communication device external to the vehicle.

The action undertaken may be a change in operating state and/or a limitation of the operating state of the motor vehicle. This makes it possible to not respond directly to the aging of the switching element by changing the operating state of the switching element and/or the electrical circuit. Thus, a current operating state can be changed in the motor vehicle in response to the aging of a switching element. In addition or alternatively, a limitation of the operating state is also possible, whereupon a group of permitted operating states of the motor vehicle is reduced so that individual operating states may be excluded, for which the aging of the switching element might constitute an impairment or which are undesirable given the detected aging of the switching element.

A traction motor of the motor vehicle may be operated by the switching element, and the action undertaken is a reduction of the power and/or a limitation of the power of the traction motor. A tractions inverter of the motor vehicle can be used as the electrical circuit. Through such a traction inverter the tractions motor of the motor vehicle can be operated, and a limiting of the power of the traction motor can also achieve a reduction of power in the operation of the traction inverter or the electrical circuit containing the switching element. The limiting of the power of the traction motor can prevent the motor vehicle from reaching an operating state in which, given the detected aging of the switching element, further impairment and/or faster further aging of the switching element may occur.

The motor vehicle can be adapted to carry out an autonomous driving operation, wherein the action initiated is an autonomous driving maneuver of the motor vehicle and/or a scheduling of the performance of an autonomous driving maneuver for a later time. In particular, in motor vehicles designed to carry out an autonomous driving operation, there are special challenges in regard to functional safety. In self-driving motor vehicles with no human driver sitting behind the steering wheel, it is not enough to activate a warning light in an instrument cluster asking the driver to go to a service station. Furthermore, when a fault occurs, the driver himself cannot access the controls of the vehicle to compensate for the effects of the fault.

By determining the voltage measurement value and/or the time measurement value in an autonomous driving motor vehicle, the motor vehicle can predict an impending impairment of the switching element and thus a possible impending function impairment of the motor vehicle, so that actions can be taken in response to the impending impairment, automatically and with full function of the switching element or the electrical circuit. Thus, a so-called "predictive maintenance" of the motor vehicle can be accomplished, in which a replacement of the switching element or the electrical circuit is initiated for example when an impending impairment is determined.

The autonomous driving maneuver performed can be a stopping maneuver or the driving to a predetermined target position, especially a repair shop or a service facility. For example, a stopping maneuver may be performed immediately or at a time after a relatively short interval during the current driving operation. The driving to a repair shop or a service facility can also be scheduled in particular at a later time, for example, after the end of a current driving operation of the motor vehicle or after reaching a currently planned driving destination. In this way, the self-driving motor vehicle can itself seek out a repair shop or a service facility in order to make possible the replacement of the aging switching element, for example.

The determination of the voltage measurement value and/or the time measurement value may begin when an output voltage falling across a switchable switching portion of the switching element and/or an output current flowing in the switching portion corresponds respectively to a first limit value, and the determination of the voltage measurement value and/or the time measurement value ends when the output voltage and/or the output current corresponds respectively to a second limit value. The output voltage may be the drain-source voltage in a switching element designed as a MOSFET. Accordingly, the output current in this case is the drain current of the MOSFET. In a switching element designed as an IGBT, the output voltage is accordingly the collector-emitter voltage and the output current is the collector current.

The appearance of the Miller plateau in the control voltage can be determined, for example, in that the output voltage of the switching element begins to drop off, i.e., it reaches a first limit value below a maximum attainable output voltage. At the same time, the output current already has its maximum value at the beginning of the Miller plateau, i.e., it corresponds to a first limit value corresponding to the maximum output current. These dependencies can be used to determine the beginning of the Miller plateau.

Accordingly, upon a drop of the output voltage to a second limit value corresponding for example to the output voltage in the conducting state of the switching element and/or an output current corresponding to the maximum output current as the second limit value, an end of the Miller plateau can be determined. This makes it possible to detect the voltage values and/or time measurement values associated with the Miller plateau through the output voltage or the output current, so that one can obtain measurement values which are comprehensible and in particular comparable to each other. This is especially advantageous when the control voltage has a rise within the Miller plateau or the variation of the Miller plateau changes with increasing aging, since in this way mutually comparable voltage measurement values and/or time measurement values can be detected regardless of this. In particular, the output voltage, the control voltage and/or the output current can be detected by the control device. For this, the control device may comprise one or more voltage measuring means and/or one or more current measuring means.

A control device can be used, comprising a driver circuit to generate the control voltage and a measurement device to detect the voltage measurement value and/or the time measurement value, wherein the driver circuit and the measurement device are realized on a common circuit board arrangement. The measurement device may also be designed to detect the output voltage of the switching element and/or the output current. It is also possible for the measurement device to relay across a communication link a measured value of the output voltage and/or the output current of the switching element. The circuit board arrangement may comprise one or more circuit boards connected to each other, especially directly interconnected.

The measurement device may comprise a measurement value detection circuit and the driver circuit comprises a control circuit, wherein a measurement value detection circuit and a control circuit are used which are designed as a common integrated circuit. This makes it possible for the control circuit of the driver circuit, which brings about the triggering of the switching element, and the measurement value detection circuit to be arranged in direct spatial proximity, which facilitates the detecting of the voltage measurement value and/or the time measurement value, since this must be performed relatively quickly.

Further elements of the measurement device, such as voltage divider or the like, can be designed separately from the integrated circuit and placed in particular on the common circuit board arrangement. Thus, the detected voltage measurement values and/or time measurement values can be processed in the control circuit of the driver circuit. The control circuit of the driver circuit may comprise, for example, a controller, especially a microcontroller, or be designed as such. The control circuit may be connected to a communication link of the motor vehicle, so that measurement information describing the detected measurement values and/or information describing the actions to be taken can be relayed via the communication link to further controllers of the motor vehicle.

A motor vehicle may comprise an electrical circuit comprising at least one switching element and a control device, wherein the switching element has a control voltage applied to it by a control device and the switching element can be switched by the control voltage, wherein the control device is adapted to carry out a method as described herein. In particular, the control voltage can be applied to the switching element by the control device. The control device adapted to carry out the method may comprise, for example, a controller, such as the controller of the control circuit of a driver circuit to generate the control voltage, which is designed to carry out a method as described herein.

All the benefits and embodiments described above in regard to methods apply accordingly to motor vehicles, and vice versa.

BRIEF DESCRIPTION OF THE SEVERAL VIEWS OF THE DRAWINGS

Further benefits and details will emerge from the embodiments described in the following, and with the aid of the drawings.

DETAILED DESCRIPTION

Figure 1:
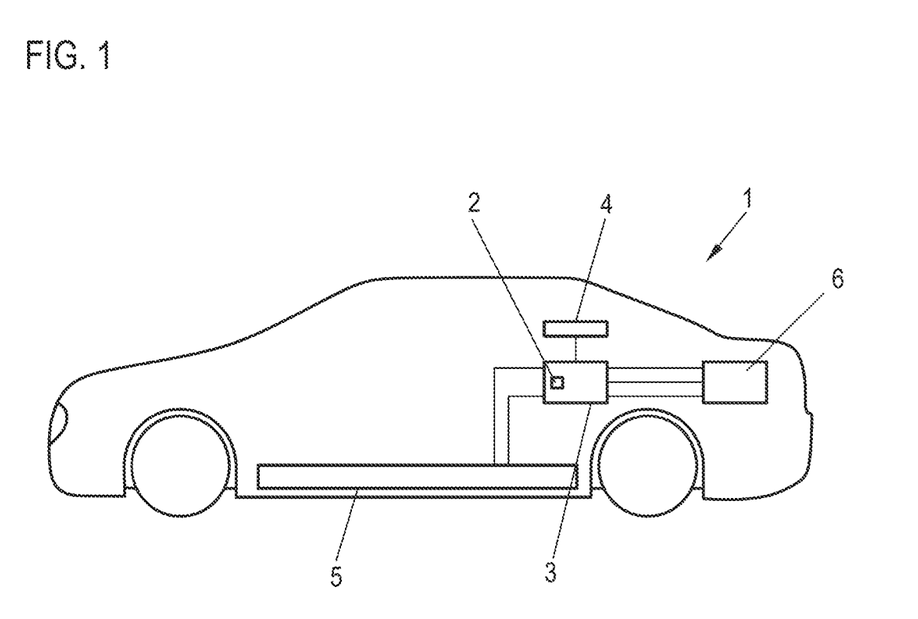
FIG. 1 illustrates a motor vehicle.

FIG. 1 represents an embodiment of a motor vehicle 1. The motor vehicle 1 comprises an electrical circuit 3 having multiple switching elements 2 as well as a control device 4. The control device 4 can apply a control voltage on the switching elements 2 of the electrical circuit 3, whereupon the switching elements 2 are respectively switched by the control voltage, i.e., alternately turned on and off, in particular.

The electrical circuit 3 in the present instance is designed as a traction inverter, which converts a direct current from a traction energy accumulator 5 of the motor vehicle 1 into an alternating current to operate an electrical traction motor 6 of the motor vehicle 1. The traction energy accumulator 5 may be designed, for example, as a high-voltage battery, wherein the electrical circuit 3 converts the direct current taken from the traction energy accumulator 5 into a three-phase alternating current, for example, to operate the traction motor 6. Conversely, the converting of an alternating current generated by the traction motor 6 in a generator operation into a direct current for charging the traction energy accumulator 5 by the electrical circuit 3 is also possible. The layout of the electrical circuit 3 and the control device 4 will be explained in detail in the following.

Figure 2:
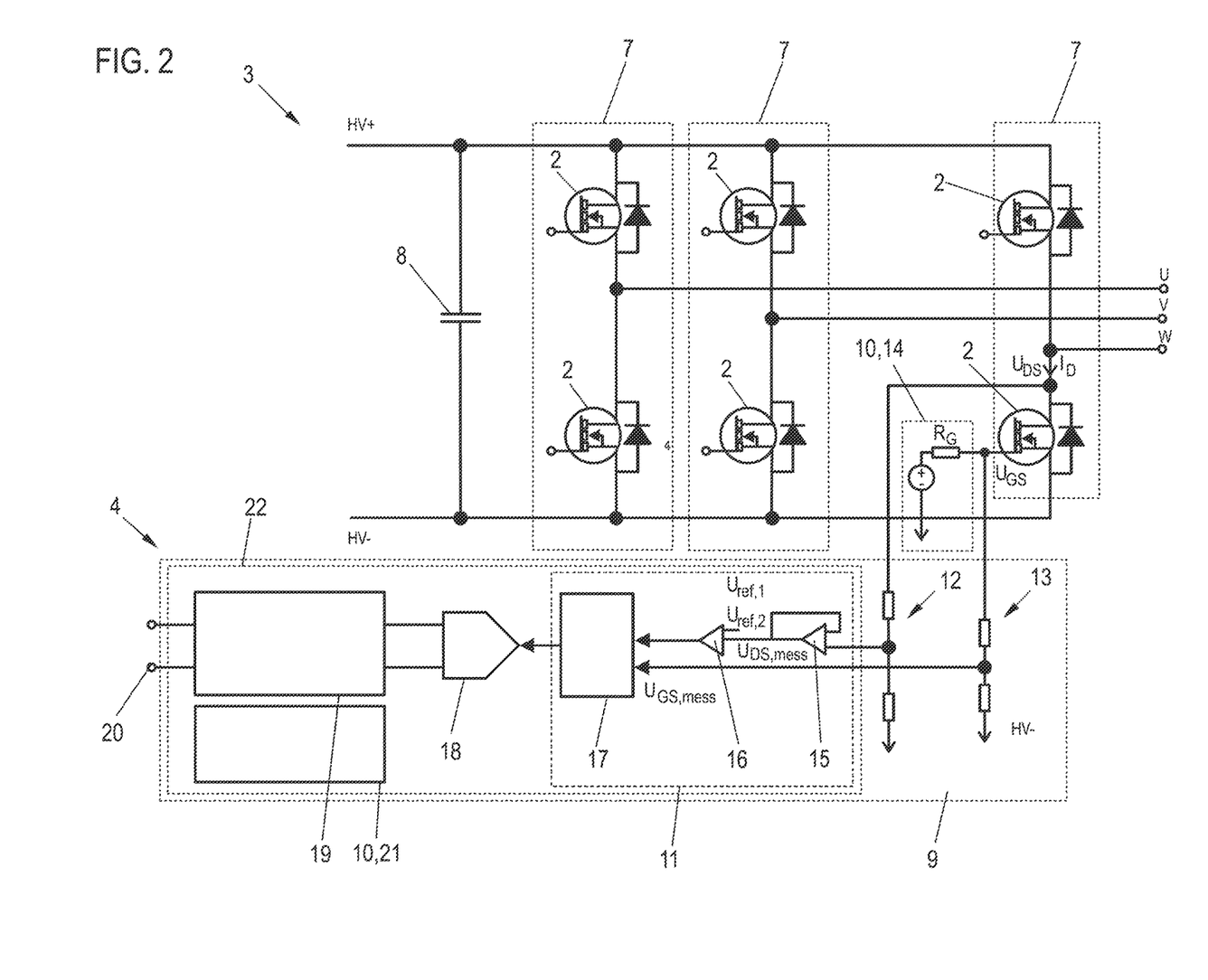
FIG. 2 is a detail view of an electrical circuit comprising multiple switching elements, as well as a control device of the motor vehicle.

FIG. 2 shows the electrical circuit 3 and the control device 4 of the motor vehicle 1. The electrical circuit 3 is designed as a three-phase bridge rectifier and it comprises six switching elements 2, which are wired as three half-bridges 7. The switching elements 2 are respectively designed as MOSFETs on a silicon carbide base (SiC-MOSFETs) and have for example a voltage strength of at least 1200 V. The electrical circuit 3 furthermore comprises an intermediate circuit capacitor 8 as well as two terminals on the direct current side, HV+ and HV−, which are connected to the traction energy accumulator 5 of the motor vehicle 1. Moreover, the electrical circuit 3 comprises three phase terminals on the alternating current side, U, V and W, which are connected to the traction motor 6 of the motor vehicle 1.

The control device 4 comprises a measurement device 9 as well as a driver circuit 10. The driver circuit 10 serves for generating a control voltage for the switching of the switching elements 2 of the electrical circuit 3. The driver circuit 10 and the measurement device 4 are realized on a common circuit board arrangement. The measurement device 9 comprises a measurement value detection circuit 11, which is implemented with a control circuit 21 of the driver circuit 10 as a common integrated circuit 22. The measurement device 9 furthermore comprises two voltage dividers 12, 13, which are formed by separate resistances arranged on the common circuit board arrangement of the driver circuit 10 and the measurement device 9.

The measurement device 9 serves for determining, during at least one switching process of one of the switching elements 2 of the electrical circuit device 3, at least one voltage measurement value describing a voltage of a Miller plateau of the control voltage $U_{GS}$ and/or at least one time measurement value describing a duration of the Miller plateau. In the present instance, there is represented the determination of a voltage measurement value and a time measurement value by the measurement device 9 for one of the switching elements 2. The measuring of voltage measurement values and time measurement values can be carried out in particular for all switching elements 2 of the electrical circuit 3, while the components of the measurement device 9 needed for the detecting of the measurement values at the other switching elements 2 are not represented for reasons of clarity.

Also only a portion 14 of the driver circuit 10 is represented, which serves for triggering one of the switching elements 2 by means of a control voltage. A control voltage is also applied to the other switching elements 2 by corresponding parts 14 of the driver circuit, these parts and the connections between the part 14 and the other parts to the control circuit 21 of the driver circuit 10 not being shown for sake of clarity.

In the present instance, the control voltage of the switching element 2 designed as a SiC-MOSFET is a gate-source voltage $U_{GS}$. The switching element 2 furthermore has a drain-source voltage $U_{DS}$ as its output voltage as well as a drain current $I_D$ as its output current. A voltage $U_{DS,mess}$ proportional to the output voltage $U_{DS}$ of the switching element 2 is picked off by the voltage divider 12 of the measurement device 9. The control voltage $U_{GS}$ of the switching element 2 is accordingly picked off by the voltage divider 13 as the proportional voltage $U_{GS,mess}$. The picking off of the control voltage $U_{GS}$ occurs between the gate terminal of the switching element 2 and a serially connected gate resistance $R_G$.

For the detecting of the measurement values, the measurement device 9 furthermore comprises a unity-gain amplifier 15 for impedance conversion and a comparator 16, with which the detected output voltage $U_{DS,mess}$ can be compared to at least one limit value $U_{ref}$. The output of the comparator 16 and the voltage measurement value $U_{GS,mess}$ of the gate voltage, picked off by the voltage divider 13, are detected by a tripping and holding device 17 of the measurement device 9. The detection of $U_{GS,mess}$ is tripped by the output of the comparator 16, especially if the falling or rising measured output voltage $U_{DS,mess}$ corresponds to the limit value $U_{ref}$ and the output of the comparator 16 switches over.

The measurement values $U_{GS,mess}$ now detected in the tripping and holding device 17 can then be digitalized by an analog-digital converter, such as a Delta-Sigma converter, and relayed via a communication interface 19, designed in particular as a galvanically separating, bidirectional communication interface, across terminals 20 to a communication link of the motor vehicle 1, such as a data bus or the like. A determination at the control circuit 21 of the driver circuit 10, designed for example as a controller, is also possible. Moreover, aging information regarding the aging of the switching element 2 can also be relayed by the communication interface 19 to a display device within the vehicle and/or to a communication device outside the vehicle.

The voltage divider 12 is designed such that it reduces the output voltage $U_{DS}$ corresponding to the voltage level of the traction energy accumulator 5 down to a lower level for the detection in the integrated circuit, for example to a voltage level of 5 Volt. Accordingly, the voltage divider 13 is also designed to reduce the gate voltage of the switching element 2, which can be between 15 Volt and 18 Volt in the switched-on state, for example, down to a comparable voltage level.

Thanks to the detecting of the voltage measurement value $U_{GS,mess}$, at least one voltage value is detected during a switching process of the switching element 2 that describes the voltage level of a Miller plateau in the variation of the control voltage $U_{GS}$ of the switching element 2. In addition or alternatively, a time measurement value can also be detected, describing the duration of the Miller plateau in the variation of the control voltage $U_{GS}$ of the switching element 2. For this, the time measurement value so determined can be the duration between a decrease in magnitude of the output voltage $U_{DS,mess}$ between a first limit value $U_{ref,1}$ and a second limit value $U_{ref,2}$. This shall be further explained in relation to FIG. 4.

The time measurement values and/or voltage measurement values determined in this way are compared each time by the measurement device 9 and/or another device of the control device 4 to at least one limit value. If at least one limit value is exceeded, the control device 4 initiates at least one action associated with the limit value so exceeded, as will be described more fully in relation to FIG. 5.

The voltage measurement value describing a voltage of the Miller plateau in the variation of the control voltage of the switching element 2 and the time measurement value describing the duration of the Miller plateau each represent a measure of the aging of the switching element 2. The switching element 2 ages during the operation of the electrical circuit 3, especially due to the temperature fluctuations which it experiences. Especially in the switched-on state, the switching element 2 can become greatly heated, since the output current $I_D$ is flowing through it.

Figure 3:
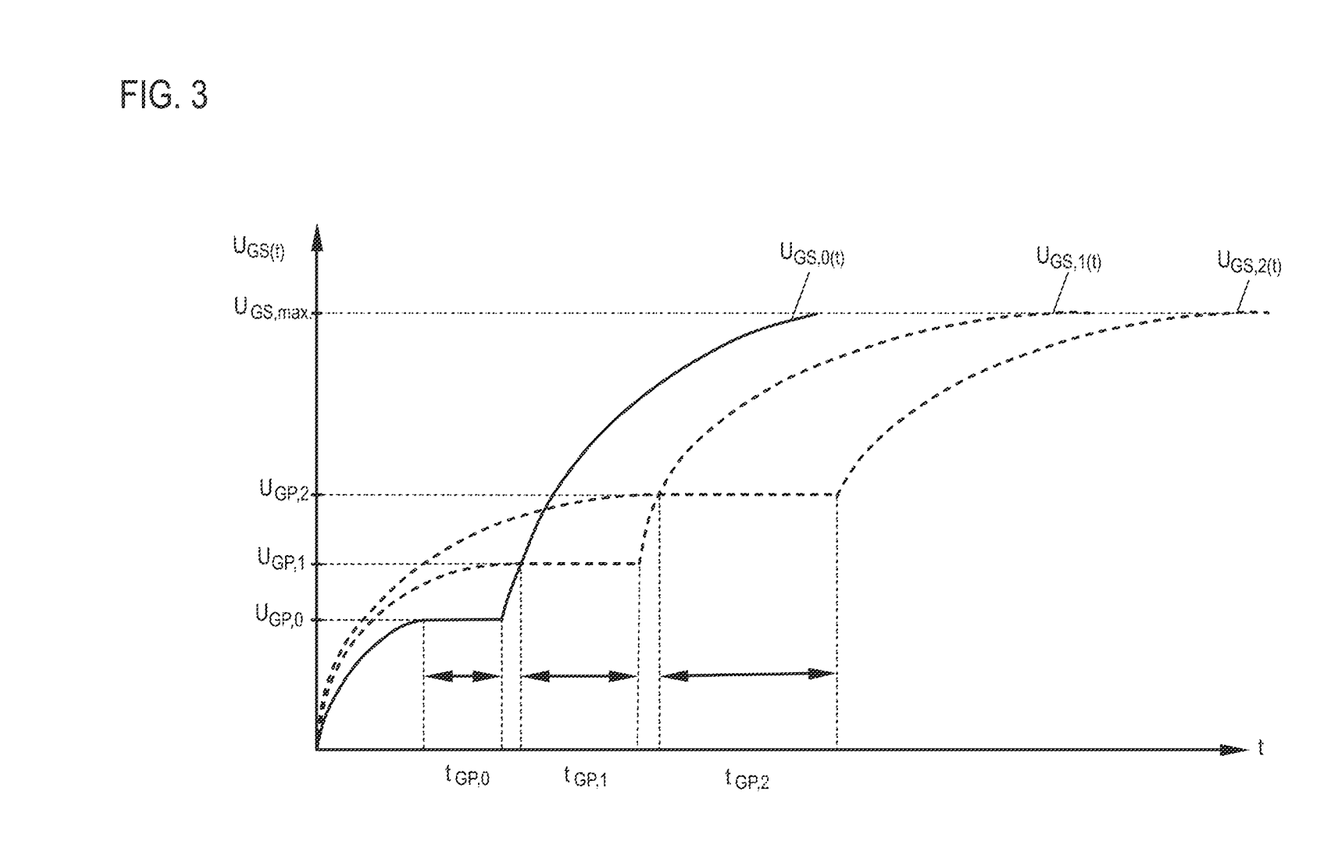
FIG. 3 is a first diagram, showing the variation of the control voltage of a switching element in various states of aging.

FIG. 3 shows schematically the variation of the control voltage $U_{GS}$ for three different aging states. The variation of the control voltage $U_{GS}$ here represents each time a switching-on process of the switching element 2. The curve $U_{GS,0}(t)$ shows the least aging phenomena, the curve $U_{GS,1}(t)$ corresponds to the variation of the gate voltage with slight age-related effects, and the curve $U_{GS,2}(t)$ corresponds to the variation of the gate voltage with stronger aging effects. Each of the curves of the control voltage $U_{GS}(t)$ has a Miller plateau, associated each time with a voltage $U_{GP,0}$, $U_{GP,1}$ or $U_{GP,2}$. Moreover, the plateaus each have a duration $t_{GP,0}$, $t_{GP,1}$ or $t_{GP,2}$. With increasing aging of the switching element 2, both the voltage of the Miller plateau $U_{GP}$ and the duration $t_{GP}$ of the Miller plateau increase. For example, the values given in the following table may occur:

|  | $U_{GS,0}(t)$ | $U_{GS,1}(t)$ | $U_{GS,2}(t)$ |
|---|---|---|---|
| gate-plateau voltage $U_{GP,i}$ [V] | 5.2 | 6.5 | 7.2 |
| gate-plateau time $t_{GP,i}$ [ns] | 50 | 64 | 86 |

The times $t_{GP,i}$ can be detected directly by the measurement device 9 as time measurement values. Based on the voltage dividers 12, 13 used, voltage measurement values $U_{GS,mess}$ proportional to $U_{GP,i}$ are detected.

Figure 4:
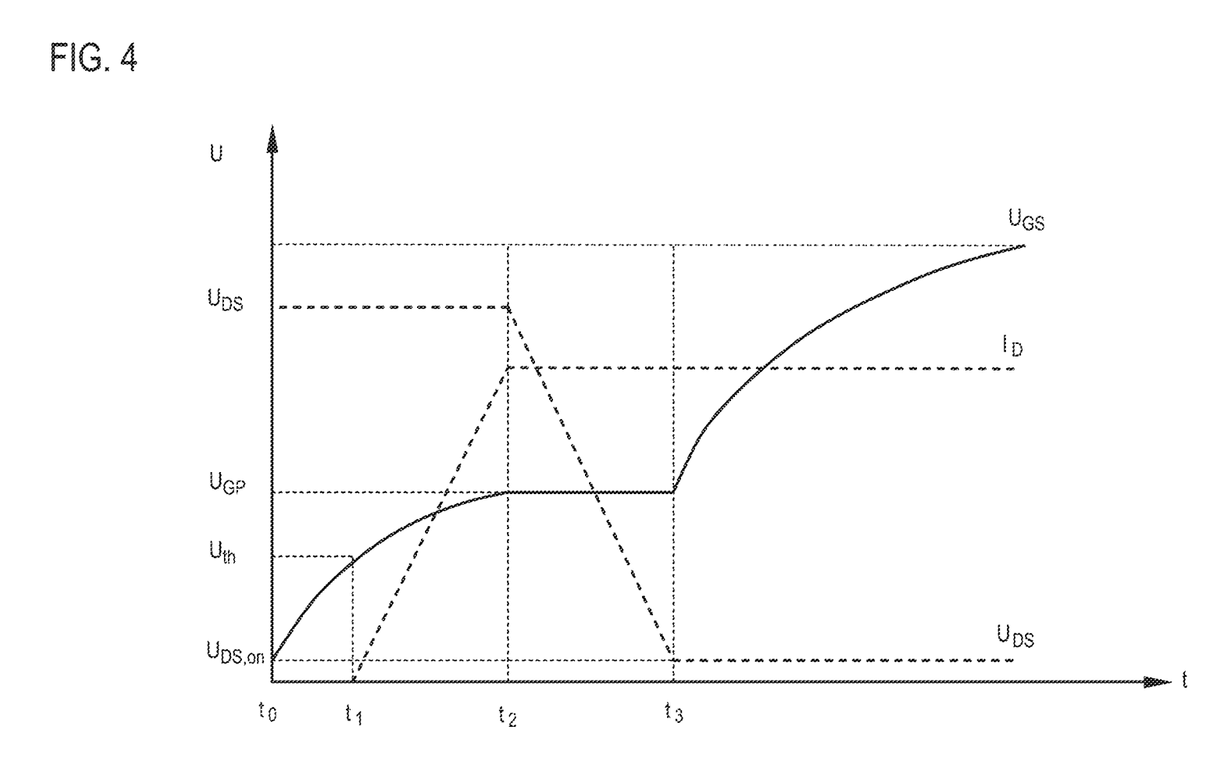
FIG. 4 is a second diagram, showing the variation of the control voltage over time to explain an embodiment of a method.

FIG. 4 shows schematically the variation of one switching voltage $U_{GS}$. The switching-on process starts at the time $t_0$ with a rising control voltage $U_{GS}$. At the time $t_1$, when the control voltage corresponds to the threshold voltage $U_{th}$, the output current $I_D$ also begins to rise. At the time $t_2$, when the Miller plateau begins, the output voltage $U_{DS}$ of the switching element 2 drops and the output current $I_D$ has reached its maximum value. At this time, the detecting of one or more voltage measurement values describing the voltage $U_{GP}$ of the Miller plateau can be commenced.

The detecting of the measurement values by the measurement device 9 can be triggered in particular when the output voltage $U_{DS}$ of the switching element 2, dropping across the switchable portion of the transistor, i.e., the drain-source section, is detected as $U_{DS,mess}$ and compared to at least one limit value $U_{ref}$. This is represented schematically in FIG. 2 as the limit value $U_{ref,1}$ at the input of the comparator 16. The limit value $U_{ref,1}$ may correspond, for example, by 95% to a maximum possible drain-source voltage $U_{DS,mess}$. In addition, it is possible for the output current $I_D$ to be measured by the measurement device 9 or relayed to the measurement device 9, for example, from a control system of the traction motor 6, in which the corresponding current occurs as a measurement value. In addition to the comparison of $U_{DS,mess}$, a comparison of $I_D$ to a limit value can also be done to trigger the measurement, in which case the limit value may correspond in particular to the maximum attainable drain current $I_{D,max}$.

The Miller plateau ends at the time $t_3$ when the voltage $U_{DS}$ has reached the value of the forward voltage $U_{DS,on}$. At this time, the measurement value detection can be halted, or the time measurement value can be detected as the time between the times $t_2$ and $t_3$. For this, $U_{DS,mess}$ can be compared to a second limit value $U_{th,2}$, corresponding to the forward voltage $U_{DS,on}$ of the switching element 2.

It is possible to detect several voltage measurement values $U_{GS,mess}$ within the duration of the Miller plateau between $t_2$ and $t_3$, especially when the variation of the control voltage $U_{GS}$ also has a rise in the region of the Miller plateau. A voltage measurement value described as the voltage of the Miller plateau can also be formed as the average of the detected voltage measurement values $U_{GS,mess}$ or the measurement value detected at time $t_2$ and the measurement value detected at time $t_3$ can be compared to each their own limit value, for example.

Figure 5:
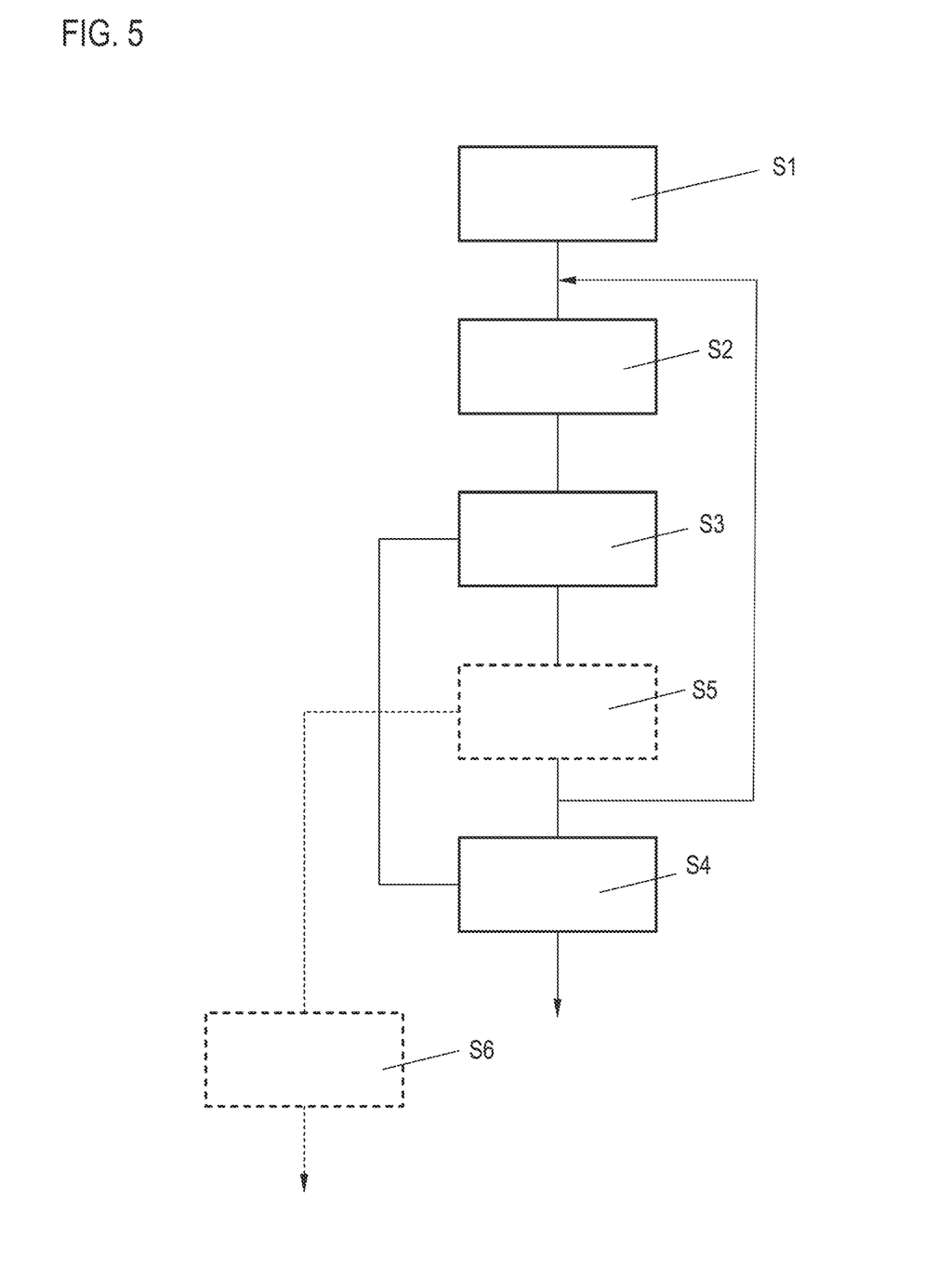
FIG. 5 is a block diagram of a method.

FIG. 5 shows a block diagram of one embodiment of a method. The method starts with a step S1, for example, when the electrical circuit 3 of the motor vehicle 1 is placed in operation. Thus, the method can start for example when the motor vehicle 1 begins to travel, and the electrical circuit 3 designed as a traction inverter will also commence its operation.

After this, in step S2, one or more voltage measurement values, each describing a voltage of the Miller plateau, are determined from the control voltage of each of the switching elements 2 of the electrical circuit 3. In addition or alternatively, as was described above, a time measurement value is also determined for each of the switching elements 2, each time representing the duration of the Miller plateau in the variation of the control voltage of the particular switching element 2.

Next, in step S3, the measurement values are compared to a respective associated limit value. If at least one of the limit values is exceeded, an action associated with the limit value will then be taken in step 4 in order to allow for the aging of the switching element. It is possible to compare the detected voltage measurement values and/or time measurement values to multiple limit values. This is represented schematically by step S5, in which a further limit value comparison is done. If this limit value is exceeded, an action associated with the further limit value so exceeded will be initiated in a step S6. Different associated actions are possible for different degrees of aging of the switching element 2 thanks to the use of different limit values. If multiple limit values are exceeded, multiple actions can be carried out, or only one action may be initiated, especially the action associated with the highest limit value.

As a first action, for example, a time interval between the determination of the voltage measurement values and/or the time measurement values for different switching processes can be decreased. For example, instead of a detection of the voltage measurement values and/or the time measurement values each time at the start of a driving operation of the motor vehicle 1, the time interval can be diminished, so that at least one voltage measurement value and/or at least one time measurement value is also detected at one or more times during the driving operation and/or at the end of the driving operation and compared to the respectively associated limit values. In this way, the frequency of detection can be increased for increasing aging of the switching element 2, so that a more precise tracking of the further aging process of the switching element 2 can occur.

Another action which can be initiated is a decreasing of the frequency of the switching processes of the switching element 2. A lowering of the output voltage $U_{DS}$ and/or the output current $I_D$ of the switching element 2 is also possible. As a last action, a disconnecting of the switching element 2 and/or the electrical circuit 3 can also be done if the aging of the switching element 2 may result in immediate impairment of the operation of the electrical circuit 3 and/or the motor vehicle 1.

It is also possible to undertake a change in operating state and/or a limitation of operating state of the motor vehicle 1 as the action. For example, the action performed can be a reduction and/or a limitation of the power capacity of the traction motor 6.

It is possible for the motor vehicle 1 to be designed to carry out an autonomous driving operation, in which case the action initiated will be an autonomous driving maneuver of the motor vehicle 1 and/or the performance of an autonomous driving maneuver at a later time. The autonomous driving maneuver performed may be in particular a stopping maneuver. It is also possible for the driving maneuver to be the driving to a predetermined target position, such as a work shop or a service facility. This makes it possible for the motor vehicle 1 in autonomous driving operation to itself seek out a servicing location when an age-related replacement of the switching elements 2 becomes necessary. In this way, a predictive maintenance of the motor vehicle 1 becomes possible. Defective switching elements 2 can thus be replaced before age-related impairments occur during their operation or the operation of the motor vehicle 1.

Furthermore, an action may be the displaying of information about the aging of the switching element 2 in the motor vehicle 1. In this way, the driver or a passenger of the motor vehicle can be made aware of the aging so discovered. The aging information may also describe a further action taken on account of the limit value exceeded, so that this action can also be made known to them. The aging information can be indicated for example on a display device of the motor vehicle. In addition or alternatively, the aging information can also be relayed to a communication device outside the vehicle.

It is also possible to employ the method as described herein for switching elements other than the switching elements of a traction inverter. Moreover, it is possible for the switching elements 2 to be designed not as silicon carbide MOSFETs, but rather as other MOSFETs or as IGBTs. In the case of IGBTs, the control voltage accordingly represents the gate-emitter voltage, the output voltage corresponds to the collector-emitter voltage, and the output current corresponds to the collector current. The detection of the voltage measurement values and/or the time measurement values can also be done in the case of the IGBT as previously described in regard to the SiC-MOSFET.

German patent application no. 10 2021 116772.8, filed Jun. 30, 2021, to which this application claims priority, is hereby incorporated herein by reference in its entirety. Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating an electrical circuit comprising at least one switching element of a motor vehicle, the method comprising:
applying a control voltage, by a control device, to the at least one switching element, wherein the at least one switching element is switched by the control voltage;
during at least one switching process, determining at least one voltage measurement value describing a voltage of a Miller plateau of the control voltage and/or at least one time measurement value describing a duration of the Miller plateau;
comparing the voltage measurement value and/or the at least one time measurement value to at least one limit value; and
upon the voltage measurement value and/or the at least one time measurement value exceeding the at least one limit value, initiating, by the control device, at least one action associated with the at least one limit value.

2. The method according to claim 1, wherein the voltage measurement value and/or the at least one time measurement value are respectively compared to multiple limit values, and different actions are associated respectively with the limit values.

3. The method according to claim 1, wherein the action involves decreasing a time interval between determination of voltage measurement values and/or the at least one time measurement value for different switching processes, decreasing a frequency of the different switching processes of the at least one switching element, decreasing an output voltage and/or an output current of the at least one switching element, disconnecting of the at least one switching element and/or the electrical circuit and/or an indication of aging information regarding aging of the at least one switching element in the motor vehicle and/or relaying of the indication of aging information to a communication device external to the motor vehicle.

4. The method according to claim 1, wherein the action undertaken is a change in operating state of the motor vehicle.

5. The method according to claim 4, wherein a traction motor of the motor vehicle is operated by the at least one switching element, and the action undertaken is a reduction of power and/or a limitation of power of the traction motor.

6. The method according to claim 4, wherein the motor vehicle is adapted to carry out an autonomous driving operation, wherein the action initiated is an autonomous driving maneuver of the motor vehicle and/or a scheduling of performance of an autonomous driving maneuver for a later time.

7. The method according to claim 6, wherein the autonomous driving maneuver performed is a stopping maneuver or driving to a predetermined target position.

8. The method according to claim 7 wherein the predetermined target position is a repair shop or a service facility.

9. The method according to claim 1, wherein a traction inverter of the motor vehicle is used as the electrical circuit.

10. The method according to claim 1, wherein determination of the voltage measurement value and/or the at least one time measurement value begins when an output voltage falling across a switchable switching portion of the at least one switching element and/or an output current flowing in the switchable switching portion corresponds respectively to a first limit value, and the determination of the voltage measurement value and/or the at least one time measurement value ends when the output voltage and/or the output current corresponds respectively to a second limit value.

11. The method according to claim 1, wherein a control device is used, comprising a driver circuit to generate the control voltage and a measurement device to detect the voltage measurement value and/or the at least one time measurement value, wherein the driver circuit and the measurement device are realized on a common circuit board arrangement.

12. The method according to claim 11 wherein the measurement device comprises a measurement value detection circuit and the driver circuit comprises a control circuit, wherein a measurement value detection circuit and a control circuit are used which are designed as a common integrated circuit.

13. A motor vehicle, comprising:
an electrical circuit including at least one switching element; and
a control device;
wherein the at least one switching element has a control voltage applied to it by the control device and the at least one switching element can be switched by the control voltage, wherein the control device is adapted to carry out a method including:
applying the control voltage, by the control device, to the at least one switching element, wherein the at least one switching element is switched by the control voltage;
during at least one switching process, determining at least one voltage measurement value describing a voltage of a Miller plateau of the control voltage and/or at least one time measurement value describing a duration of the Miller plateau;
comparing the voltage measurement value and/or the at least one time measurement value to at least one limit value; and
upon the voltage measurement value and/or the at least one time measurement value exceeding the at least one limit value, initiating, by the control device, at least one action associated with the at least one limit value.

* * * * *